March 15, 1932.     H. J. MURRAY     1,849,721
POWER TRANSMISSION MECHANISM
Filed March 30, 1922    2 Sheets-Sheet 1
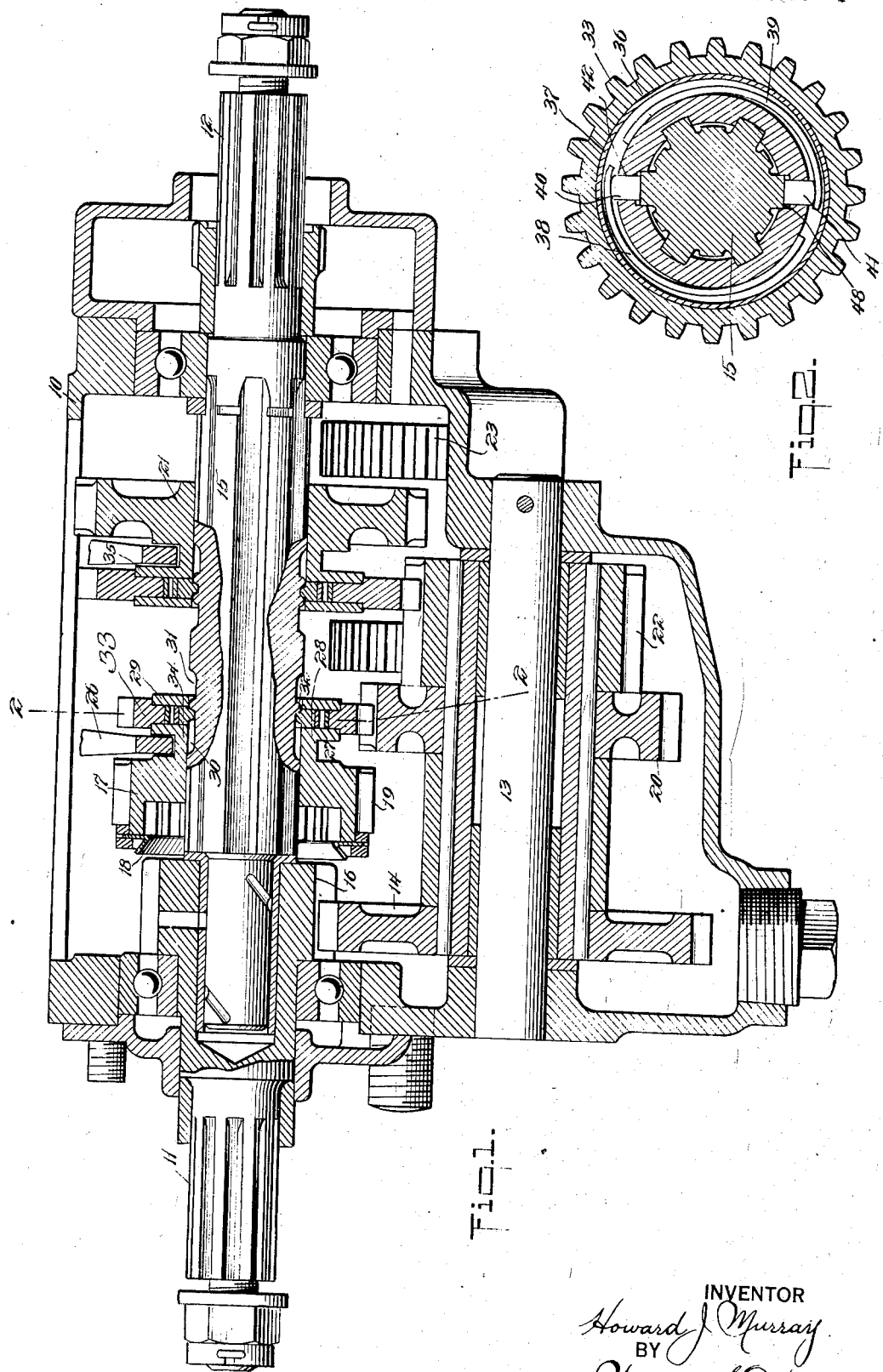
INVENTOR
Howard J. Murray
BY
Warren S. Orton
ATTORNEY March 15, 1932. H. J. MURRAY 1,849,721
POWER TRANSMISSION MECHANISM
Filed March 30, 1922 2 Sheets-Sheet 2

INVENTOR
Howard J. Murray
BY
Warren S. Orton.
ATTORNEY

Patented Mar. 15, 1932

1,849,721

UNITED STATES PATENT OFFICE

HOWARD J. MURRAY, OF NEW YORK, N. Y., ASSIGNOR TO R. M. COMPANY, INC., OF EAST PITTSBURGH, PENNSYLVANIA, A CORPORATION OF DELAWARE

POWER TRANSMISSION MECHANISM

Application filed March 30, 1922. Serial No. 548,235.

The invention relates in general to a variable speed power transmission mechanism of the shift gear type and in which the power driven gear and the load carrying gear are coordinated through the interposition of a friction clutch so that the gears will tend to assume a speed of rotation approximately equal to each other before the gears are moved into meshed position. The invention specifically relates to that type of gear synchronizing mechanism in which the actuation of a single manually operated control member moved in one direction causes the gears to be connected together through the medium of the friction clutch and the continued movement of which control member will cause the clutch to become inoperative automatically just prior to the intermeshing of the gears in their direct driving relation.

Such devices now known are complicated both in structural design and in operation and where such prior devices have been used as part of the power transmission in automotive vehicle constructions, they have the additional objection in that the synchronizing mechanism is usually an additional part which tends to lengthen the over-all dimensions of the transmission casing. This elongation of the transmission casing is especially objectionable in situations where space economy is vital and where lightness of weight is an objective as in aeroplane motor constructions.

Accordingly, the primary object of the invention is to provide a simplified form of gear synchronizing mechanism which will be characterized by a reduction in the number of parts heretofore regarded as necessary in such constructions, and to provide a synchronizer which can be installed in a transmission casing of the usual dimensions and without materially adding to the weight of known similar structures.

Still another object of the invention is to provide a synchronizer of the friction clutch type which can be controlled in its movement to and from its operative position by the movement of the control which moves the shiftable gear along its shaft and which clutch will be positive in its actuation, governed in its sequential operation in proper timed relation to the movement of the sliding gear on its shaft and not dependent upon the functioning of some other device such as the controlling springs found in the prior art.

Still another object of the invention when considered in connection with its application to the driving mechanism in an automotive vehicle transmission casing is to provide a gear synnchronizing device which can be installed in known forms of such organizations simply by substituting a slightly different form of sliding gear for the sliding gear now used and which installation will in no way affect the transmission as it is at present designed, and at the same time, to provide such a structure as can utilize the present form of gear shifting control for actuating the synchronizing device.

Various other objects and advantages of the invention will be in part obvious from an inspection of the accompanying drawings and in part will be more fully set forth in the following particular description and one form of mechanism embodying my invention, and the invention also consists in certain novel features of construction and combination of parts hereinafter set forth and claimed.

Referring to the accompanying drawings:—

Figure 1 is a sectional view taken axially of the power shafts through a transmission casing of conventional form equipped with two forms of synchronizing devices, one of which constitutes a preferred embodiment of the invention herein featured;

Figure 2 is a transverse sectional view of one of the featured synchronizers and taken on the line 2—2 of Figure 1;

Figure 3:
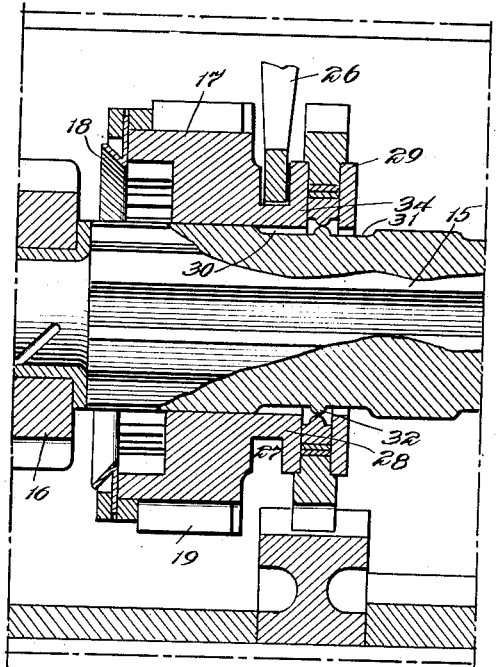
Figure 4:
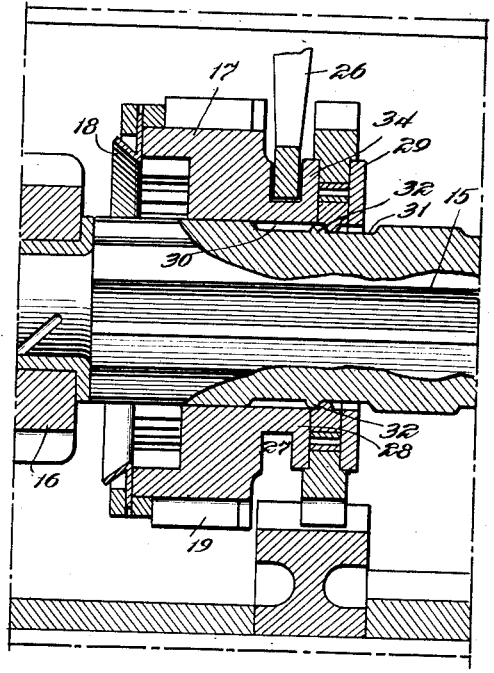
Figure 5:
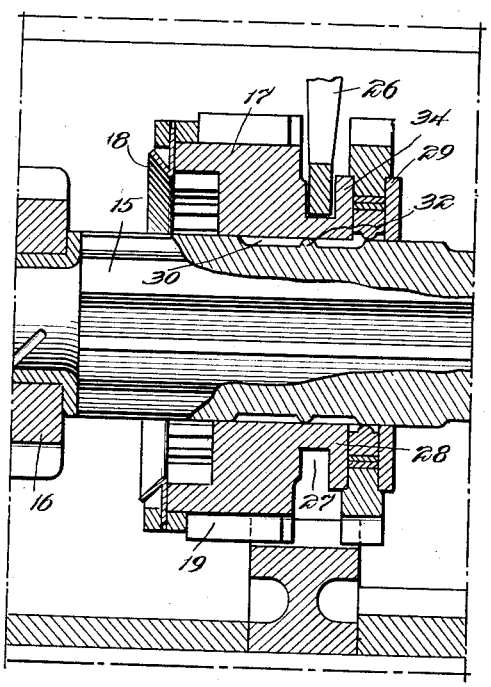
Figure 6:
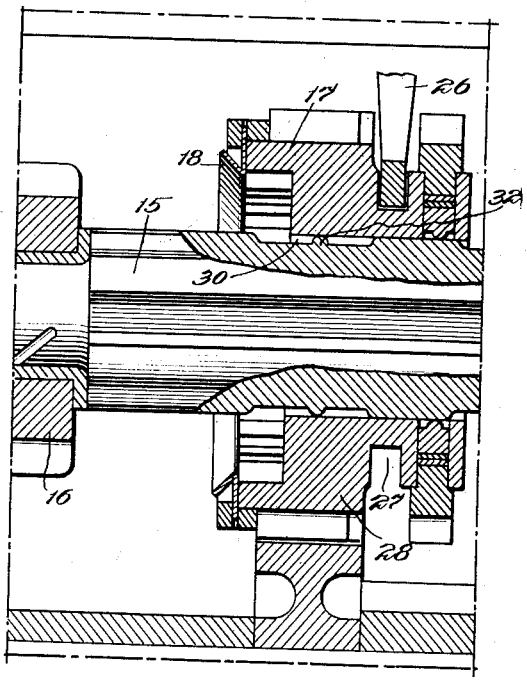

Figures 3 to 6 inclusive are each enlarged views largely in axial section of parts of the gear trains forming the second speed drive of the structure shown in Figure 1 and showing in succeeding views the relation of the gears and the coacting synchronizer when moved from an inoperative position with the gears unmeshed into a position with the gears in their intermeshing relation; Figure 3 showing the position of the parts succeeding the showing in Figure 1 and in which the synchronizer is operatively disposed; Figure 4 showing the synchronizer inoperatively disposed just prior to the meshing of the gears; Figure 5 showing the gears moving into meshing position and with the synchronizer moving into position clutched to its carrying shaft and Figure 6 showing the final position with the gears meshed and the synchronizer disposed in driving connection locked to its shaft.

The invention is herein described in connection with a variable speed transmission of the conventional slide gear type which has been selected to illustrate the adaptability of the invention to an organization driving numerous gears but it is obvious that the invention may be applied to any situation in which gears or other driving mechanism are to be moved to and from a meshed or driving position.

In the drawings there is shown a containing casing 10 for housing the several parts and for providing bearings for the several shafts and shift rods entering therein. Further for the purpose of showing the applicability of this invention to an automobile engine construction it will be considered that the shaft 11 is a power shaft operatively connected with the engine shaft of an automobile and that the shaft 12 is a propeller shaft operatively connected to drive the traction wheels of an automobile.

The propeller shaft projects into the casing in alignment with the power shaft and has certain portions thereof non-circular in cross-section to accommodate the combined sliding gear and clutch units hereinafter described. A counter-shaft 13 provided with a main drive gear 14 adjacent one end is rotatably mounted within the casing and parallels the encased non-circular portion 15 of the propeller shaft. The gear 14 is constantly in mesh with a main driving gear 16 fixed to the power shaft 11 so that the countershaft is constantly connected to be driven from or to drive the power shaft. A sliding gear unit 17 is keyed to the shaft 15 so as to rotate therewith, and is designed to mesh with the gear 16 to provide a direct drive between the shafts 11 and 12. There is disclosed in Figure 1 a synchronizing device 18 for causing the speed of the gears 16 and 17 to synchronize before they are moved into meshing position.

The gear unit 17 is also provided with external teeth 19 hereinafter referred to as a driven gear and adapted, when meshed with a gear 20 keyed to the countershaft and hereinafter referred to specifically as a driving gear, to obtain second speed. Another gear 21 keyed to and slidably mounted on the shaft portion 15 is designed in one shifted position to mesh with a gear 22 on the countershaft to obtain first speed and in another shifted position to mesh with an intermediate gear 23 to obtain reversed speed. A longitudinally shiftable control rod (not shown) is connected by means of a laterally extending yoke arm 26 working in a groove 27 to control the gear unit 17 and a corresponding rod (not shown) is similarly connected to the sliding gear unit 21 so as to move the same into mesh to obtain first speed or to obtain reverse speed.

The construction as thus far described is of conventional design and has been illustrated in some detail simply to show that the inventive features herein claimed can be readily installed in a transmission casing of approved form.

In the following description particular reference will be made to the synchronizing of gears 19 and 20 but it will be understood that the invention with obvious mechanical changes can be adapted for use in other locations and as an illustration of one such use reference is made to the first speed and reverse speed synchronizing arrangement shown at the right side of Figure 1.

The shiftable gear unit 17 herein illustrated differs from the conventional form in that the gear proper is provided with an extension forming a hub 28 on which is mounted a synchronizer 29. The portion of the shaft on which this extension slides is provided, on diametrically opposite sides, with a pair of longitudinally spaced apart recesses 30 and 31 forming a projection 32 therebetween. Opposite sides of the projections 32 are beveled or rounded and the coacting faces of the plungers 40 and 41 are similarly rounded so that as the shiftable unit 17 or 21 is moved under the manual action of the shift lever the advanced rounded sides of the plungers engage with the adjacent sides of the projections and react therewith to wedge or cam the clutch elements into their clutched positions. In those cases where the clutch bands are only so far out of contact that the parts may slip relative to each other, the distance necessary for the plungers to move is slight compared to the distance travelled by the shiftable gear. It is practically necessary in most instances that a powerful clutching action be attained from the relatively weak manual force available in shifting the gears and accordingly the wedging surfaces of the plungers 40 and 41 and projections 32 are designed to provide a mechanical advantage in favor of the lever and the parts such as the unit 17 shifted thereby. The synchronizer includes a synchronizer gear 33 mounted for rotary movement about the axis of the shaft part 15 and which gear 33 is journalled on and is fitted between a pair of bearing plates 34 and 29 projecting outwardly from the hub portion of the extension 28. The gear 33 is a spur gear of ring form and is provided on its inner periphery 36 with an outer clutch band 37. Positioned between the hub 28 and the outer clutch band 37 is a pair of curved semi-circular inner clutch bands 38 and 39 disposed in circumferential alignment. One end of the band 38 is secured to and controlled by a plunger 40 and the opposite end of the band 39 is similarly connected to a plunger 41. The plungers 40 and 41 are guided in aligned guiding recesses 48 formed in the hub 28 and are maintained by the resiliency of the band connected thereto in bearing engagement with the shaft portion 15. The plungers are disposed so that when the gear unit is shifted on the shaft, they are projected into the recesses 30 and 31, ride over the projection 32 and onto the portions of the shaft at opposite ends of the recesses. It will be understood that the parts are so proportioned that when the plungers are in the recesses the inner and outer clutch bands are out of contact or at least are in such position that the parts may slip relative to each other in their rotary movement and that when the sliding gear is in certain positions the internal clutch thus provided is inoperative.

In operation and assuming that it is desired to move the gears 19 and 20 from their unmeshed position shown in Figure 1 into their fully meshed position shown in Figure 6. It is noted that in the showing in Figure 1 the plungers 40 and 41 are in the first recess 30 and therefore the friction clutch is in an inoperative position although the synchronizing gear is in mesh with the driving gear 20. The gear unit 17 is moved to the right and into the position shown in Figure 3. This movement causes the plunger to ride up on the projection 32 and in this way the clutch is moved into operative position and provides a friction drive between the driving gear 20 and the driven gear unit 17.

This will cause the gears to be jerked approximately into the same speed during the instant of time that the plungers are riding across the projection. The continued movement of the control will cause the plungers to slide down off the projections and to move from the position shown in Figure 3 into the position shown in Figure 4. In Figure 4 the synchronizer is shown in unclutched position with its gear turning idly and thus the frictional driving connection between the gears is intercepted just prior to the movement of the gears into their meshed position.

Further outlining the movement of the parts on the continued advance of the control member it will be noted that in moving from the position shown in Figure 4 into the position shown in Figure 5 the gears are caused to assume a meshing engagement as the synchronizer is about to move away from the driving gear 20. It is suggested that the teeth of the moving gear be bevelled at their outer ends to insure an easy movement of the teeth into their meshing position. As the synchronizer gear is moved into its inoperative position shown in Figure 6 the plungers ride up out of the second recess as indicated in Figure 5 and onto the unrecessed part of the shaft. In this way the synchronizer is again brought into positive driving connection with the shaft during the time that the gears are meshed and as more particularly shown in Figure 6.

It will be understood that this restoration of the friction clutch into its driving relation with the shaft is for the purpose of having the synchronizer gear normally turning at the speed of the driven gear when separated from the same. In this way it is possible when the control member is moved in the opposite direction to effect an unclutching of the power gears, to have the synchronizing gear driving at a speed to cause the same to mesh readily with the driving gear in its movement back into the position shown in Figure 1.

By means of a device of this character it is possible to provide a simplified form of synchronizing device which will possess the positive clutching features characterizing an internal band clutch and which can be made sufficiently small to be contained within the projected outlines of the shiftable gear. An internal clutch gear of the type herein disclosed has been found to be a particularly effective form of clutch, is positive in its actuation, is free of looseness of fit and resulting rattle and does not readily wear with use. The synchronizing device is carried directly on and movable with the shiftable gear and therefore does not require any separate mechanism, support or housing for carrying the same. The construction is so designed that worn or damaged parts can be readily replaced and the parts can be lubricated at the same time that the other gear parts are lubricated and without necessity for providing any special device for effecting this lubrication.

As the gears are connected through the clutching action of the synchronizing device the gears must necessarily be driving at the same speed, or as is usual with such constructions, and as disclosed in Patent No. 1,268,269 granted jointly to me and to Walter S. Rugg on June 4, 1918, at a slightly different speed to permit the gear teeth to pass each other slowly and abnormal strain on the gear teeth is eliminated. The number of teeth on the synchronizing gear 33 differs slightly from the number of teeth on the power gear 19 and in the instant case it will be assumed that the number of teeth on the synchronizing gear is one less than the number of teeth on the gear 19. It is obviously within the scope of this disclosure to reverse this condition and have the greater number of teeth on the synchronizing gear. Differently expressed, the gears 19, 20 and 33 constitute a hunting tooth gear set with the gears 19 and 33 having the same pitch diameter and both designed to mesh with the common third gear 20. This construction permits the meshing of the counter and sliding gears even if the synchronizing gear be fully synchronized or turning at the same angular velocity as the sliding gear and it also permits meshing of the gears at relatively low speed. It is possible to mesh the gears even when the positions of the teeth are in alignment as the teeth are in relatively slow angular movement even when the gears are turning at the same speed.

While I have shown and described and have pointed out in the annexed claims, certain novel features of my invention, it will be understood that various omissions, substitutions and changes in the form and details of the device illustrated and in its operation may be made by those skilled in the art without departing from the spirit of the invention.

It is obvious that there is no necessity for preselecting the proper synchronizer prior to the actuation of its associate gears. In fact the operator need not know that the device is equipped with synchronizing devices. He simply shifts the control shift lever as usual into first, second, third or reverse position as desired and the proper synchronizer functions automatically and without attention from the operator. In an emergency the operator can snap the desired gears into position, taking chances on stripping the gears and in this case the device acts as if it were not equipped with a synchronizer. The most effective synchronizing effect is attained only when there has been a sufficient time lapse of pressure applied to permit the friction clutch elements to grip each other positively and the degree of synchronizing is proportionate to the time lapse between an instantaneous pressure application and this sufficient time lapse.

Having thus described my invention, I claim:

1. In a gear transmission, the combination of a shaft provided with a pair of longitudinally spaced recesses forming a projection therebetween, a power transmitting gear keyed to the shaft and slidable longitudinally thereon, an internal band clutch carried by the gear and shiftable therewith, the outer element of said clutch constituting a synchronizing gear capable of rotating relative to the power gear and about the axis of the shaft, a third power gear adapted to mesh with the two shiftable gears and a plunger movable into said recess and on to said projection for controlling the operativeness of the clutch, said recess and projection cooperating to cause the clutch to effect in sequence an operative driving connection between the first named power gear and the third power gear, a movement of the clutch into an inoperative position and a driving connection between the synchronizing gear and said shaft.

2. In a device of the class described, the combination of a gear train including a driving and a driven gear, one of which is slidable axially relative to the other to and from a meshing position, said sliding gear constituting one element of a friction clutch, a coacting element slidable with the slidable gear and provided with teeth for meshing with the other gear, a shiftable control member operatively connected to said sliding gear to control the same and said coacting element of the friction clutch, and means controlled by the position of said coacting clutch element relative to said other gear for changing the operative status of the friction clutch and for maintaining the same in said changed status while the gears are being moved relative to each other into their unmeshed position.

3. In a device of the class described, the combination of a gear train including a gear fixed relative to its axis of rotation, a carrying shaft and a shiftable gear movable axially thereon to and from a meshing engagement with the fixed gear, a third gear, journalled on the shiftable gear and movable therewith to and from a meshing engagement with the fixed gear, clutching means between the third gear and the shiftable gear for transmitting rotary movement from one to the other, and means controlled by the position of the shiftable gear on its carrying shaft for moving the clutching means to and from its operative position, and a control for said clutching means.

4. The combination of two gears shiftable relative to each other and to and from an intermeshing position, means including a friction clutch carried by one of the gears and controlled by the relative position of the gears for causing the gears to approach the same speed as they are moved towards their meshing position and declutching means operatively connected to said last named means for causing the gears to become entirely free of each other just prior to intermeshing.

5. In a gear transmission, the combination of two gears, one shiftable axially relative to the other to and from an intermeshing position, mechanism including a clutch carried by one of the gears and operatively disposed for driving one gear from the other and a control for the clutch actuated simultaneously with the sliding movement of the shiftable gear in its approach to its associated gear for causing the clutch to become operative during the initial movement of the sliding gear towards the other gear and for causing the clutch to become inoperative and thus free the gears of any mutual restraint at the instant the gears are moved into meshing position.

6. In a device of the class described, the combination of a driving and a driven element, means for moving the same into interengaging position, mechanism including means turning with one of the elements carried by and having a clutch connection with the other element for causing the speed of rotation of one element to approach that of the other as they are moved towards their interengaging position and means operatively connected to function incidental to the relative position of the elements while moving into said interengaging position for causing the clutch elements of said connection to become separated and thus intercept the clutch driving connection between the driving and driven elements.

7. In a device of the class described, the combination of a driving and a driven element, means for moving the same into interengaging position, mechanism including normally inoperative clutching means carried by one of the elements with the parts of said clutch connected to the driving and driven elements when in inoperative position and adapted when operatively disposed to constitute a driving connection between the elements for causing the speed of rotation of one element to approach that of the other as they are moved into interengaging position and said mechanism including means operatively connected to act simultaneously with the approach of the elements into their interengaging position for causing in sequence a movement of the clutching means into an operative driving connection and then into a position to permit the clutching means to become inoperative just prior to the interengaging of the elements.

8. In a device of the class described, the combination of a pair of gears adapted to be shifted into a driving relation, one of said gears constituting an element of a clutch, a coacting clutch element adapted to be moved into meshing relation with the other gear and a control for said clutch operably independent of said other gear and said clutch operably controlled by the gear of which it forms a part.

9. In a transmission gearing, the combination of a shaft, a gear carried by and slidable axially on said shaft, a second gear slidable with the first gear and adapted to rotate relative thereto, means for securing the gears to rotate together and a control for said securing means operatively connected to said shaft and governed by the shifted position of the first named gear on its carrying shaft.

10. In a transmission gearing, the combination of a shaft, a gear slidable axially on said shaft, a second gear slidable with the first gear and adapted to rotate relative thereto, means for securing the gears to rotate together, said shaft provided with a recess and a plunger for controlling said securing means in turn actuated by the movement of said plunger into and out of said recess.

11. In a transmission gearing, the combination of a shaft having a recess therein, a gear synchronizer slidable on said shaft, said synchronizer including clutching means for securing the same to the shaft to rotate therewith and a control for the clutching means operatively controlled by the movement of an element thereof into said recess.

12. In a transmission gearing, the combination of a shaft, provided with a recess, a carrier keyed to the shaft and slidable axially thereon, an inner clutch band including a plunger guided by the carrier and controlled by the movement of the plunger into and out of said recess as the carrier is moved along the shaft and a synchronizing gear mounted for rotary movement about the axis of the shaft and having an inner periphery coacting with the inner clutch band to form a friction driving clutch between the synchronizing gear and the shaft and which clutch is controlled by the position of the carrier relative to the recess in the shaft.

13. In a transmission gearing, the combination of a shaft provided with a clutch control, a power gear keyed to the shaft and including an extension slidable axially thereon, a synchronizing gear journalled for rotary movement on said extension, a clutch between the power gear and the synchronizing gear including an inner clutch band provided with a plunger projecting radially through the extension and coacting with said clutch control on the shaft to govern the operativeness of the clutch.

14. In a transmission gearing, the combination of a shaft provided with a clutch control, a power gear keyed to the shaft and including an extension slidable axially thereon, a synchronizing gear journalled for rotary movement on said extension, a clutch between the power gear and the synchronizing gear including an inner clutch band, provided with a plunger projecting radially through the extension and coacting with said clutch control on the shaft to govern the operativeness of the clutch, and a single manually actuated control for sliding both gears and for controlling the status of the clutch.

15. In a device of the class described, the combination with a driving member and a driven member movable relative to each other to and from a mutual driving relation, of synchronizing means carried by one of the members for causing the members to approach the same speed before they are in their driving relation, means controlled by the relative position of the members for causing said synchronizing means to become inoperative as the members are moved into their mutual driving relation and a single control movable in one direction for causing in sequence an operative condition of the synchronizing means and finally the mutual driving condition of said members while substantially in relatively fixed rotary position and simultaneously a recoupling of said synchronizing means with one of said members.

16. In a device of the class described, the combination with a driving member and a driven member movable axially relative to each other into and from a mutual driving relation, of synchronizing means between the members for causing the same to approach the same speed before they are in said driving relation, said means including a friction clutch connecting the members and moved into inoperative position by the movement of one of the members when said member approaches its driving relation with the other member and means for connecting the clutch in driving relation to one of said members following the movement of the members into their driving relation.

17. In a device of the class described, the combination of a pair of gears, means for synchronizing the speed of said gears prior to their intermeshing engagement, and a control means for causing in sequence, a driving connection between the synchronizing means prior to the meshing of the gears, the interception of said driving connection as the gears are about to mesh and a restoration of said driving connection following the intermeshing of the gears.

18. In a device of the class described, the combination of a pair of gears slidable relative to each other to and from a meshing position, a synchronizer carried by one of the gears for causing the gears to assume approximately the same speed as they are moved towards their meshing position, said synchronizer including a synchronizing gear having an inner periphery constituting a friction surface capable of relative movement to and from an operative position and substantially fixed against relative longitudinal movement.

19. In a variable speed power transmission, the combination of a counter-shaft and a power shaft disposed in offset and parallel relation, a power transmitting gear fixed to the counter-shaft to rotate therewith and fixed against axial movement thereon, a gear unit secured to the power shaft to turn therewith and slidable axially thereon to and from a meshing position with the fixed gear on the counter-shaft, a synchronizing device carried by the axially shiftable gear unit for causing the gears to approach the same speed prior to their meshing and having an operative and an inoperative position, said shiftable gear unit provided on one side of the synchronizer with a peripheral groove, and a shiftable member working in said groove to move the synchronizer device in one direction to cause in sequence the movement of the synchronizer device into its operative position and then to cause the gears to intermesh.

20. In a transmission gearing, the combination of two power transmitting gears free to rotate about their axis and otherwise fixed, a shaft, a single gear unit keyed to the shaft and adapted when moved in one direction to mesh with one of said gears and when moved in the opposite direction to mesh with the other of said gears, a single synchronizer device carried by the shiftable gear unit for causing the gear unit to approach the speed of whichever gear it is approaching, said synchronizer device normally having a freedom of rotary movement relative to the unit on which it is mounted, and a shift member engaging the gear to shift the same in both directions from a normal inoperative position and to cause the synchronizer device to function when moved from said position in either direction.

21. In a device of the class described, the combination with a driving member and a driven member movable axially relative to each other into and from a mutual driving relation, of synchronizing means between the members for causing the same to approach the same speed before they are moved fully into said driving relation, said synchronizing means including a gear in mesh with one of said members otherwise free of restraint therefrom and adapted to turn relative to the other member, a friction clutch between said synchronizer and said other member, said clutching having curved interengaging faces extending in the general direction of their common axis of rotation, and control means acting on said other member in a direction parallel to the axis of curvature of the interengaging surfaces of the clutch and operatively connected in its movement in one direction to cause said clutch to become active and to cause relative axial movement of said members into their driving relation.

22. In a device of the class described, the combination of a pair of gears, one being axially fixed and the other being shiftable into and from an intermeshing engagement therewith, a synchronizer carried by the shiftable gear for causing the gears to assume approximately the same speed as they are moved towards their meshing position, said synchronizer including a synchronizer gear adapted to mesh with the axially fixed gear, a friction clutch between the synchronizer gear and the shiftable gear, said synchronizer gear having its inner periphery defined by two curved surfaces, one constituting the means for rotatably mounting the same on the shiftable gear and the other constituting one of the faces of the friction clutch or clutching said last named gear to the shiftable gear.

23. In a device of the class described, the combination of two power members, one constituting a gear fixed against axial movement and the other constituting a shaft, a synchronizing device for causing the fixed gear and shaft to approach present relative speed, said device including a unit slidable bodily on the shaft and including two relatively movable parts, one part sliding on the shaft and the other part provided with means adapted to be moved into engagement with the fixed gear to provide a positive interdriving mechanical engagement with said fixed gear, said two parts provided with means coacting to form a friction clutch, therebetween, and control means bearing on the part sliding on the shaft for shifting the unit as a whole and for controlling the friction clutch, and means interposing a retardance to the freedom of axial movement of the unit on the shaft and means operable incidental to the shifting of the unit past and beyond said retardance for causing the friction clutch to connect the two parts of the unit to each other.

24. In a device of the class described, the combination of two power members, one constituting a gear fixed against axial movement and the other constituting a shaft, a synchronizing device for causing the fixed gear and shaft to approach present relative speed, said device including a unit slidable bodily on the shaft and including two relatively movable parts, one part engaging and sliding on the shaft and the other part provided with means adapted to be moved into engagement with the fixed gear to provide a positive interdriving mechanical engagement with said fixed gear, said two parts provided with means coacting to form a friction clutch therebetween and control means for shifting the unit as a whole, means tending to retard the freedom of axial movement of the unit on the shaft, and to cause the clutch to function and means for causing the friction clutch to move into an inoperative position when the unit is moved beyond said retarding means.

25. In a gear synchronizing device, the combination of a unitary article adapted to be mounted on a power shaft and including a shiftable gear provided with a groove, a shifting yoke arm in said groove, a synchronizer movable with said gear and normally free to rotate thereon, said synchronizer provided with a curved friction surface and means actuated by the shifting of the yoke arm for effecting a clutching engagement between the synchronizer and gear through said curved friction surface.

26. In a transmission gearing, the combination of an axially fixed gear, an axially movable gear adapted to mesh therewith, means independent of the fixed gear for restraining the freedom of axial movement of the movable gear in its approach to the fixed gear, a synchronizer carried by the movable gear for causing the gears to approach the same speed just prior to moving into intermeshing relation and a control for said synchronizer governed by the engagement of said shiftable gear with said restraining means.

27. In a device of the class described, the combination with a power gear and a shaft adapted to be connected to drive one from the other, of synchronizing means for causing the gear and shaft to approach a present relative speed, said means including a sliding gear unit keyed to the shaft and including a shaft driven gear adapted to intermesh with the power gear, a synchronizing gear mounted for rotary movement on the unit and also adapted to mesh with the power gear, clutch forming elements on the synchronizer gear and unit coacting when operatively disposed to form a clutch to retard relative movement between the unit and synchronizer gear and thus tend to bring them to the same speed, means controlled by the shifting of said unit for causing said clutch to function, one of said clutch elements being resilient and providing a resilient escapement engagement with the coacting element when one rides past the other and a control fork operatively connected to the sliding unit and movable in one direction to cause in sequence the functioning of said clutch and the moving of the shaft driven gear into mesh with the power gear.

28. In a device of the class described, the combination with two members adapted to drive one from the other, of synchronizing means for causing the members to approach the same speed, said means including a sliding unit connected to one of the members to turn therewith and provided with means for engaging the other member to turn therewith, a synchronizer gear mounted for rotary movement on the sliding unit and adapted to engage said other member to turn therewith, means for clutching the gear to the unit, said clutching means including coacting clutch faces carried by one of said members and operatively connected to turn with the other of a resilient friction face having a sliding contact with the coacting clutch forming element, said clutching means adapted to interpose a braking action on the freedom of relative rotary movement between the unit and gear, and a manually actuated control for said clutch.

29. A synchronizing device for bringing two rotary elements to the same speed, said device comprising a shaft, two members mounted for independent rotary movement, one of said members supported on the other and said other member supported on and turning with the shaft, and each member provided with the element of a friction clutch for driving one member from the other, a metal spring forming one of the clutch elements and providing an exposed, metallic friction face adapted to be engaged by the coacting element of the clutch to retard the relative rotary movement of said members and thus tend to bring them to the same speed and control means for moving said clutch elements into operative position.

30. In a variable speed power transmission, the combination of a driving and a driven member each mounted for rotary movement and adapted to be moved into an interdriving relation, synchronizing means for causing the members to approach the same speed prior to assuming said interdriving relation, a manually actuated shift lever movable in one direction for controlling the relative movement of said members and for controlling said synchronizing means, said means including a friction clutch with the clutch element provided with one of the friction clutch faces turning with one of said members, and the clutch element provided with the coacting clutch face being shiftable relative to the first named element and carried by the other member, said clutch faces being normally in an unclutched inoperative position, and said synchronizing means including resilient means operable in all positions of the transmission tending to maintain said clutch faces in their unclutched position and also including normally inactive pressure mechanism operatively connected to function incidental to the initial shifting action of said shift lever to bear on the shiftable clutch element to cause the clutch to become operative momentarily against the resistance of said resilient means and thus connect the members frictionally and substantially in relatively fixed driving relation and said pressure mechanism including means controlled by the further actuation of the shift lever, and operable in time relation just prior to the movement of said members into said interdriving relation for releasing the pressing action of said mechanism on the shiftable clutch element and thus permit the friction clutch to be restored to its normal inoperative position and permit the movement of the synchronized members into their interdriving relation independent of the friction clutch and of its actuating pressure mechanism.

31. In a device of the class described, the combination of a pair of gears adapted to be shifted into intermeshing relation, synchronizing means for causing the gears to approach the same speed incidental to their movement towards said intermeshing relation, said means including a friction clutch with its clutch faces normally spaced slightly apart and adapted to be moved into engagement for driving one of the gears from the other, a control for said clutch including a manually actuated member for shifting the gears and also including two relatively overrunning members, actuated by the movement of said manually actuated member, one of said overrunning members adapted to pass the other and in passing to contact and cause relative movement therebetween, said relative movement of the control members acting on the clutch to cause the same to function during the interval while said members are passing each other.

32. In a gear transmission, the combination of a spline shaft, a pair of gears adapted to be shifted into an interdriving relation, one of said gears being fixed axially, and the other gear splined to and slidable on said shaft, said slidable gear provided with an annular groove, synchronizing means for causing the gears to approach the same speed before they are moved into their interengaging position, said means including a friction clutch provided with curved interengaging clutch faces extending substantially in the direction of the length of the shaft and encircling the same and including a resilient part tending to shift the interengaging clutch faces relative to each other, said clutch having one of its clutch elements turning with one of the gears and having its coacting clutch element carried by and turning with the other gear, and force transmitting means acting through said resilient member including a manually actuated control with a part thereof engaging in the groove in the sliding gear to shift the same to and from its engagement with the relatively fixed gear, and means governed by the actuation of the control, and operable as the sliding gear is shifted towards its meshing relation with the fixed gear to shift the clutch faces and from an unclutched into clutching relation thereby to cause the axially fixed gear to turn with the shaft through the friction clutch.

33. In a device of the class described, the combination of a pair of gears, one being relatively fixed and the other shiftable axially into meshing engagement with the fixed gear, a synchronizer between the gears for causing the same to approach the same speed prior to intermeshing, said synchronizer including a friction clutch with one of its elements turning with one of the gears and the other element carried by and turning with the other gear and said elements when in clutched position providing a friction drive between the gears, resilient means tending to maintain said clutch elements in an inoperative, unclutched position, a combined gear shift and synchronizer control mechanism, including a lever movable in one direction for causing the synchronizer to function, and for causing the gears to intermesh, said control including an overrunning pressure means operable in time relation to the movement of the shiftable gear to bear on the shiftable clutch element, cause the clutch to become operative and then releasing said bearing and thus permit the clutch to become inoperative prior to the intermeshing of the gears.

34. In a device of the class described, the combination of a spline shaft, a gear normally free to rotate about the axis of said shaft and having a curved friction face, a synchronizing member encircling and slidably mounted on the shaft and splined thereto to turn therewith, said member provided with a curved friction face coacting with the similar face on the gear to form a normally inoperative friction clutch, means acting on the synchronizer member within the outlines of its perimeter to shift the same into position to connect the gear and shaft through said friction clutch and a manually actuated control member movable axially of the shaft for causing said means to function.

35. The combination with a power transmission including a pair of main shafts, gears on said shafts adapted to establish a drive between the shafts, means for connecting and disconnecting said drive, of synchronizing means adapted to establish the desired speed relation between the main shafts before they are placed in driving relation, said synchronizing means including a curved member, a member normally freely rotatable on said curved member, means to produce engagement between the curved surface of said member and the normally freely rotatable member and said synchronizing means including resilient means tending to separate said members when free of said last named means.

36. The combination in a power transmission including a pair of shafts, gears on said shafts adapted to establish a drive between the shafts, means including an axially shiftable member for connecting and disconnecting said drive, of synchronizing means for establishing the desired speed relation between the shafts before the drive is connected, said synchronizing means comprising a friction clutch including a friction element, a coacting friction element normally freely rotatable relative to the first named friction element, and means whereby said elements will coact when in firm clutching position to be substantially fixed relative to each other, and camming means including a cam having surfaces designed to impart a greater force to effect said relatively fixed engagement of the synchronizing friction elements than that applied to shift the shiftable member.

37. The combination in a power transmission including a pair of shafts, gears on said shafts adapted to establish a drive between the shafts, means including an axially shiftable member for connecting and disconnecting said drive, of synchronizing means for establishing the desired speed relation between the shafts before the drive is connected, said synchronizing means including a friction clutch mounted on one of the shafts with the elements of said friction clutch connected to said gears when in inoperative position and camming means actuated by said shiftable member for progressively wedging together the friction faces of the said frictional clutch, and means for operating the shiftable member.

38. In a device of the class described, the combination of a pair of power members, one of which is adapted to be shifted into driving relation with the other, a shaft carrying one of the members, synchronizing means for causing the members to approach a common speed before they become engaged, said means including a friction clutch having its interengaging friction faces curved about the shaft, one of the coacting elements of said clutch connected with and movable with the shiftable member and the other element of which is provided with gear teeth disposed in advance of the shiftable member outlining and containing within its tooth periphery all of the parts of the synchronizer clutch, adapted to mesh with said other member and providing the sole connection between the other member and the synchronizer when the power members are in their normal, non-driving relation, control means adapted to be moved into bearing engagement with said shiftable power member to move the same axially and means operatively responsive to the movements of said shiftable power member to cause the synchronizer to function.

39. Multiple speed power transmission gearing including a power gear and a second gear slidable axially in one direction into meshing engagement with the power gear, means for synchronizing the speeds of said gears, including a clutch with its elements connected to said gears when in inoperative position and said elements having the same angular speed when in final clutching position, a control means including a shift lever for shifting the second gear into its meshing relation with the power gear and said control means including a force resolving camming means operatively associating the shift lever and said synchronizing clutch for resolving the force of said lever into a component for shifting said second gear and a component acting on the synchronizer clutch to move the same into its final clutching position with a mechanical advantage in favor of the component for actuating the clutch.

40. In a device of the class described, the combination of a pair of gears movable relative to each other to and from a meshing position, a synchronizer carried by one of the gears and adapted to mesh with the other gear and a locking cam for connecting the synchronizer and its carrying gear in interdriving relation.

41. In a device of the class described, the combination of a shaft provided with a recess, of a gear unit slidable on the shaft, a synchronizer gear mounted on the unit for rotary movement and a locking cam controlled by the position of the unit relative to the recess for securing the synchronizer gear to rotate with the unit and shaft.

42. In a device of the class described, the combination of a shaft, a pair of power transmitting gears, one of which is shiftable on said shaft to and from an intermeshing engagement with the other gear, means for resisting the shifting movement of said gear, a synchronizer gear mounted for free rotary movement on the shiftable gear and adapted to be moved into mesh with said other power gear, said synchronizer gear and said shiftable gear provided with clutching means co-acting to provide a friction drive between the same and a single control means bearing on the synchronizer gear and movable in one direction for causing said friction drive to become effective for causing the gear to overcome the restraint of said resisting means and for causing the power gears to be moved into mesh.

43. In a device of the class described, the combination with a driving member and a driven member movable axially relative to each other into and from a driving position, of synchronizing means including a rotor carried by one of the members turning with the other member and free of restraint from said other member when moved axially and means operatively connected to function incidental to the succeeding positions of the members in their relative movement into their driving position for causing the synchronizing means first to become operative and thus cause the members to approach the same speed and then to cause the synchronizing means to become functionally inoperative prior to the engagement of the members in their driving relation.

44. In a device of the class described, the combination of power mechanism including a shaft and a pair of interdriving elements, having relative axial movement, one of said elements turning with the shaft, manually actuated means for moving said elements into their interdriving relation, synchronizing mechanism, including rotative means for causing the speed of rotation of one of said elements to approach that of the other as they are moved towards their interdriving relation, said synchronizing mechanism including a normally inoperative clutch, both elements of said clutch supported from said shaft and encircling the same, and the movable element of the clutch mounted for limited movement relative to the mechanism which carries the same, clutch controlling means acting on the movable element of the clutch and on opposite sides of the axis of the shaft for moving the clutch positively into operative position incidental to the relative movement of said power elements towards their interdriving position, said clutch controlling means including power translating elements for translating a relatively long movement of the manually actuated means into a short movement of said movable element of the clutch, and said clutch controlling means operatively connected to function incidental to the relative position of said interdriving elements for releasing said clutch prior to the movement of the elements into their interdriving position.

45. In a device of the class described, the combination of a pair of rotative power members movable relative to each other to and from a positive, mechanically connected interdriving position, synchronizing means for causing said members to approach the same speed before being moved into said interdriving position, said synchronizing means including a friction clutch operatively connected to said power members to cause the same to rotate together while connected frictionally through said clutch prior to being moved into their mechanical interdriving position, mechanism including a manually actuated shift member for causing said synchronizing means to function and for moving the power members to and from their interdriving position and said friction clutch including means for resiliently holding the same in its non-clutching inoperative position when free of said mechanism thereby to prevent any accidental functioning of said friction clutch.

46. In a device of the class described, the combination of two gears movable relative to each other axially and constituting a clutch and a third gear adapted to mesh with both of said gears, a shifter member directly engaging one of the clutch gears for moving the same axially into clutching engagement with the other clutch gear and for moving both of said gears when so clutched into operative engagement with the third gear.

47. In a power transmission mechanism having two parallel shafts and engageable and disengageable positive torque transmitting connections between said shafts whereby one may be driven from the other, an engageable and disengageable friction torque transmitting connection between said shafts including a friction device comprising relatively circumferentially disposed friction elements, one encircling the other and one movable with respect to the other, said torque transmitting connection including means for driving one of the clutch elements from one of the shafts and means for driving the other clutch element from the other shaft, force resolving means including a camming device, and a relatively movable part acting at right angles to one of the shafts and operatively associated with the camming device to actuate the movable friction element for causing engagement of the friction elements, and manually controllable means for effecting operation of the force resolving means and establishing the positive torque transmitting connections.

48. In a power transmission mechanism having two parallel shafts, a pair of power gears providing an engageable and disengageable positive torque transmitting connection between said shafts whereby one may be driven from the other, means for causing one of the shafts to approach the speed of the other prior to effecting said positive torque transmitting connection, said means including one of said power gears, a friction drive with one of its elements comprising a synchronizer gear in mesh with said power gear, said friction drive comprising friction elements, one movable with respect to the other, with one element connected to the synchronizer gear to turn therewith and the other element connected to the other power gear to turn therewith, force resolving means including a camming device and a relatively movable part acting radially with respect to both shafts and operatively controlled by the camming device and engaging the movable friction element to effect a forceful actuation of the same for causing engagement of the friction elements and a manually controllable means operatively connected for effecting in sequence an operation of the force revolving means and friction device to effect synchronization of the shafts and power gears, and then for moving the power gears into position for establishing the positive torque transmission connection of the power gears when so synchronized.

49. In a power transmission, the combination of two power transmitting members shiftable relative to each other to and from an interdriving relation, synchronizing means for causing one of the members to approach the speed of the other, said means including a clutch carried by one of the members and having one of its clutching elements operatively connected to one of said members to be turned therewith and having its coacting element operatively connected to the other element to turn therewith, means whereby said clutch is controlled when said members are in a certain non-driving relation for causing the clutch to become operative and thus cause the synchronizing means to function and means whereby said clutch is moved into de-clutching position just before the members move into their interdriving position thereby to cause the clutch automatically to become inoperative and thus cause the synchronized members to become entirely free of each other just prior to being moved into their interdriving position.

50. In a gear transmisison, the combination of two rotative units each provided with a power gear, one shiftable axially relative to the other to and from an intermeshing position, a synchronizer gear in mesh with one of the power gears, a clutch operatively disposed between the synchronizer gear and the other power gear for interdriving the synchronizer gear and said other power gear from each other, said synchronizer gear and clutch providing a driving connection for driving one power gear from the other, manually actuated means for causing the shiftable gear to approach and finally to be moved into meshing engagement with the other power gear, clutch controlling means operative by the relative position of the power gears during the initial movement of the shiftable power gear towards the other power gear for causing the clutch to become operative and said clutch including de-clutching means coacting with the clutch controlling means and operable in timed relation to the movement of the shiftable gear at the instant the gears are moved into meshing position for causing the clutch to become inoperative and thus free the gears of any mutual restraint as they move into meshing position.

51. In a device of the class described, the combination of a driving and a driven element, means for moving the same into interengaging position, mechanism including means connected to and thus turning with one of the elements, carried by and having a clutch connection with the other element, for causing the speed of rotation of one element to approach that of the other as said moving means are shifted in a direction to cause the elements to be moved into their interengaging position and said mechanism also including means operatively connected to function incidental to the relative position of the elements for causing the clutch elements of said connection to become separated and thus interrupt the clutch driving connection between the driving and driven elements.

52. In a device of the class described, the combination of a driving and driven element, means for moving the same in a relative axial direction into interengaging position, a normally inoperative clutch carried by one of the elements, fixed thereto so as to be movable axially therewith in its movements towards and from its interengaging position with the other element, with the parts of said clutch connected to the driving and driven elements and adapted when operatively disposed to constitute a driving connection between the elements for causing the speed of rotation of one element to approach that of the other before they are moved into interengaging position, means including radially movable devices for controlling said clutch, and said clutch controlling means including instrumentalities whereby axial movement of said elements will cause a movement of the clutching means into an operative driving connection and then into a position to permit the clutching means to become inoperative just prior to the interengaging of the elements.

53. The combination with a power transmision including a pair of main shafts, gears on said shafts adapted to be moved into intermeshing position to establish a drive between the shafts, one of said gears provided with a bearing means for connecting and disconnecting said gears, of synchronizing means adapted to establish the desired speed relation between the gears before they are placed in intermeshing relation, said synchronizing means including a member rotatable on said bearing, means to produce engagement between the gear provided with said bearing and the rotatable member carried thereby and said synchronizing means including resilient means tending to separate said members when free of said last named means.

54. The combination in a power transmission including a pair of shafts, gears on said shafts adapted to be moved relative to each other to and from an intermeshing position and thus when in mesh to establish a positive drive between the shafts, means including an axially shiftable member for connecting and disconnecting said drive, of synchronizing means for establishing the desired speed relation between the shafts before the drive is connected, said synchronizing means comprising a friction element, a coacting friction element normally freely rotatable relative to the first named friction element, said elements having a common axis of rotation and camming means including a cam positioned between said axis and one of the friction elements and having surfaces designed to impart a greater force to effect engagement of the synchronizing friction elements than that applied to shift the shiftable member.

55. In a device of the class described, the combination of a pair of power transmitting units each mounted for rotary movement about its own axis and each including a spur gear, one of said gears movable axially relative to the other into and from a positive intermeshing position, of synchronizing means including a spur gear carried by one of said units, in meshed engagement with and thus rotated by the gear on the other unit and said synchronizing spur gear being free of restraint from said gear on the other unit when moved axially relative thereto, said synchronizing means also including a clutch for connecting the synchronizing gear with the unit on which it is carried, and means including cam members operatively connected to function incidental to the different positions of the axially movable power gear for causing the synchronizing means first to become operative and thus cause the units with their associated gears to approach the same speed and then to cause the synchronizing means to become functionally inoperative just prior to the engagement of the power spur gears in their positive intermeshing position.

56. In a device of the class described, the combination of a pair of gears, one movable axially to and from a meshing engagement with the other, synchronizing means for causing said gears to approach the same speed before being moved into said meshing position, said synchronizing means including a friction clutch operatively connected to the gears to cause them to rotate together while connected frictionally through said clutch prior to being moved into their meshing relation, mechanism including a manually actuated shift member for causing said synchronizing means to function and for moving the axially shiftable gear to and from its meshing relation with the other gear and said friction clutch including resilient means constituting the movable element of the clutch and acting normally to hold the clutch in its non-clutching inoperative position.

57. In a device of the class described, the combination of a positive mechanical drive including a pair of rotative toothed elements, a shaft, one of said elements keyed to the shaft to turn therewith and slidable thereon to and from the other element, said other element fixed relative to the axis about which it turns, said elements adapted to be moved by the shifting of the element keyed to the shaft into interdriving tooth meshing relation, synchronizing means for causing the elements to approach the same speed before they are moved into their interdriving relation, said synchronizing means comprising a friction clutch including a pair of concentric friction clutch elements, one of said clutch elements connected to turn with one of the toothed clutch elements and the other clutch element connected to turn with the other toothed clutch element, a manually actuated control for shifting the slidable element of the positive drive and for causing the synchronizing means to become operative, said synchronizing means including devices acting on one of the clutch elements and cams operatively associated with said shaft for actuating said devices upon sliding said shiftable element to cause said devices to act in timed sequence during the initial movement of the said shiftable toothed element and prior to the movement of the same into its interdriving relation for exerting pressure on said friction clutch element and thus causing a clutching together of the clutch elements, and instrumentalities for causing said devices to move into an inoperative position just prior to the movement of the toothed elements into their interdriving relation for releasing the pressure on said clutch element and thus permit the clutch to become inoperative.

Signed at New York city, in the county of New York and State of New York this 27th day of March, A. D. 1922.

HOWARD J. MURRAY.